US007067027B2

(12) United States Patent
Swift

(10) Patent No.: US 7,067,027 B2
(45) Date of Patent: Jun. 27, 2006

(54) METHOD OF MAKING AN ELECTRO-MECHANICAL ROLL

(75) Inventor: Joseph A. Swift, Ontario, NY (US)

(73) Assignee: Xerox Corporation, Stamford, CT (US)

(*) Notice: Subject to any disclaimer, the term of this patent is extended or adjusted under 35 U.S.C. 154(b) by 518 days.

(21) Appl. No.: 09/996,819

(22) Filed: Nov. 30, 2001

(65) Prior Publication Data

US 2003/0102075 A1 Jun. 5, 2003

(51) Int. Cl.
*B32B 31/00* (2006.01)

(52) U.S. Cl. ....................... 156/153; 156/250; 156/293; 29/895.213

(58) Field of Classification Search ............ 29/895.213; 492/39, 40; 156/250, 293, 153
See application file for complete search history.

(56) References Cited

U.S. PATENT DOCUMENTS

| | | | | | |
|---|---|---|---|---|---|
| 691,011 | A | | 1/1902 | Sheehan | 492/40 |
| 696,416 | A | | 1/1902 | Denegre | 492/40 |
| 861,888 | A | * | 7/1907 | Perkins | 29/895.213 |
| 2,404,159 | A | | 7/1946 | Barber | 91/67.8 |
| 2,807,233 | A | | 9/1957 | Fitch | 118/637 |
| 2,836,725 | A | | 5/1958 | Vyverberg | 250/49.5 |
| 3,043,684 | A | | 7/1962 | Mayer | 96/1 |
| 3,267,840 | A | | 8/1966 | Honma et al. | 101/1 |
| 3,328,193 | A | | 6/1967 | Oliphant et al. | 117/37 |
| 3,525,146 | A | | 8/1970 | Hayashida et al. | 29/589 |
| 3,598,580 | A | | 8/1971 | Baltazzi et al. | 96/1.4 |
| T892,013 | I4 | * | 11/1971 | Edwards | 29/895.213 |
| 3,630,591 | A | | 12/1971 | Eastman | 355/3 |
| 3,684,364 | A | | 8/1972 | Schmidlin | 355/3 |
| 3,691,992 | A | | 9/1972 | Beemer | 118/107 |
| 3,702,482 | A | | 11/1972 | Dolcimascolo et al. | 346/74 ES |
| 3,782,205 | A | | 1/1974 | Fletcher et al. | 73/497 |
| 3,796,423 | A | | 3/1974 | Shuster | 270/68 A |
| 3,812,782 | A | | 5/1974 | Funahashi | 101/367 |
| 3,832,055 | A | | 8/1974 | Hamaker | 355/3 R |
| 3,847,260 | A | | 11/1974 | Fowler | 193/37 |
| 3,847,478 | A | | 11/1974 | Young | 355/3 |
| 3,866,572 | A | | 2/1975 | Gundlach | 118/637 |
| 3,924,943 | A | | 12/1975 | Fletcher | 355/3 R |
| 3,959,573 | A | | 5/1976 | Eddy et al. | 428/425 |
| 3,959,574 | A | | 5/1976 | Seanor et al. | 428/425 |
| 3,966,199 | A | | 6/1976 | Silverberg | 271/275 |
| 4,010,528 | A | | 3/1977 | Bohmer | 29/125 |
| 4,116,894 | A | | 9/1978 | Lentz et al. | 521/94 |
| 4,309,803 | A | | 1/1982 | Blaszak | 29/130 |
| 4,352,230 | A | | 10/1982 | Sukenik | 29/125 |
| 4,379,630 | A | | 4/1983 | Suzuki | 355/3 TR |
| 4,397,072 | A | | 8/1983 | Otthofer, Jr. | 29/401.1 |
| 4,669,163 | A | * | 6/1987 | Lux et al. | 29/895.213 |
| 4,974,782 | A | | 12/1990 | Nelson | 241/227 |
| 5,075,731 | A | | 12/1991 | Kamimura et al. | 355/274 |
| 5,307,563 | A | * | 5/1994 | Svenka | 29/895.213 |
| 5,321,476 | A | | 6/1994 | Gross | 355/271 |
| 5,742,880 | A | | 4/1998 | Takenaka et al. | 399/176 |
| 5,744,238 | A | | 4/1998 | Limperis et al. | 428/411.1 |
| 5,849,399 | A | | 12/1998 | Law et al. | 428/212 |
| 5,893,821 | A | | 4/1999 | Ando et al. | 492/59 |
| 5,897,248 | A | | 4/1999 | Schlueter, Jr. et al. | 399/313 |
| 5,970,297 | A | | 10/1999 | Gross | 399/313 |
| 6,173,149 | B1 | | 1/2001 | Kim | 399/313 |
| 6,280,371 | B1 | | 8/2001 | Krippelz | 492/39 |
| 6,471,625 | B1 | | 10/2002 | Jimenez | 492/6 |
| 2002/0159803 | A1 | | 10/2002 | Jader | 399/313 |

FOREIGN PATENT DOCUMENTS

JP 55-88919 A * 8/1980

* cited by examiner

*Primary Examiner*—Jeff H. Aftergut
(74) *Attorney, Agent, or Firm*—Andrew D. Ryan

(57) ABSTRACT

Method of making an electro-mechanical roll such as a bias transfer roll for use in an electrostatographic apparatus such as a printing or copying apparatus comprising a conductive core having a segmented layer of compressible material positioned in a tandem relation to another thereon to form a generally cylindrical roll.

24 Claims, 4 Drawing Sheets

METHOD OF MAKING AN ELECTRO-MECHANICAL ROLL

BACKGROUND OF THE INVENTION

The present invention relates generally to an apparatus for transferring of charged toner particles in an electrostatographic printing machine, and more particularly, to an electromechanical roll such as a bias transfer roll including a plurality of compressible segments positioned in a tandem relation on an electrically conductive core.

Reference is made to co-pending application, Ser. No. 09/997,178 entitled, Electro-Mechanical Roll, Docket D/99132, filed concurrently herewith, and the disclosure of which is totally incorporated herein by reference.

While existing electro-mechanical rolls are generally suitable, improvements in development quality and manufacturing efficiency are desired. Therefore, a cost-effective electro-mechanical roll of suitable lengths is beneficial.

Examples of electromechanical rolls such as bias transfer roll and systems can be found in U.S. Pat. Nos. 2,807,233; 2,836,725; 3,043,684; 3,267,840; 3,328,193; 3,598,580; 3,525,146; 3,630,5911, 3,684,364; 3,691,992; 3,702,482; 3,782,205; 3,832,055; 3,847,478; 3,866,572; 3,924,943; 3,959,573; 3,959,574; 3,966,199; 4,116,894; 4,309,803; 5,321,476; 5,849,399; 5,897,248, and 5,970,297.

All documents cited herein, including the foregoing, are incorporated herein in their entireties for all purposes.

SUMMARY OF THE INVENTION

In one aspect, provided is a method of making an electromechanical roll for an electrostatographic apparatus including: providing a plurality of tubes, each of the tubes having an outside surface and a length and two ends, the tube material including at least one of an elastomer and polymer formulation; cutting at least one end of each of the plurality of tubes to form a selected end geometry; providing an electrically conductive member; disposing the plurality of tubes on the electrically conductive member in a tandem relationship; and positioning the plurality of tubes such that each of the tubes are located up to 0.3 inches apart from another tube. The method of making the electro-mechanical roll for an electrostatographic apparatus may further include: cleaning the electrically conductive core prior to disposing the plurality of tubes thereon; applying an adhesive to the core member; applying a lubricant to the electrically conductive core prior to disposing the plurality of tubes thereon; contacting at least one end of each tube with an end of another tube; applying compression of at least 1 gram/sq. mm to the outside surface of the tubes; allowing the adhesive to cure; grinding the circumference of the outside surface; applying a coating on the outside surface of the tubes; allowing the coating to dry; and positioning the tubes such that each tube is located up to 0.1 inches away from another tube.

In yet another aspect, provided is a method of making an electromechanical roll including: providing a plurality of tubes, each of the tubes having an outside surface, a length of at least 0.5 inches, and two ends; cutting an end portion of selected tubes to form selected geometries for matching joining regions between ends of adjacent tubes; providing a core member; applying an adhesive layer to the core member; disposing the plurality of tubes on the core member and matching joining regions between selected geometries of adjacent tubes; contacting the joining regions together; applying compression of at least 1 gram/sq. mm to the outside surface; allowing the adhesive to cure; grinding the circumference of the outside surface; applying a coating on the outside surface; and allowing the coating to dry. The method of making an electromechanical roll may further include: using a molding process to form the plurality of tubes; using a foaming process to form the plurality of tubes; and using an extrusion process to form the plurality of tubes.

In a further aspect, provided is a method of making an electro-mechanical roll for an electrostatographic apparatus including: providing an electrically conductive core having a length and an outside surface; providing a plurality of conformable members, each of the plurality of members having a length; disposing the plurality of conformable members coaxially over a portion of the outside surface of the electrically conductive core; and positioning the plurality of members in tandem relationship to one another along the outside surface of the electrically conductive core such that no tube is located greater than 0.3 inches from another tube. The method of making an electromechanical roll for an electrostatographic apparatus may further include: applying a coating over the plurality of conformable members; providing a plurality of members including a polymer and an electrically conductive core including a stainless steel; providing each conformable member in the form of a tube-shaped segment having a length ranging from 0.5 inches to 18 inches; providing from 2 to 24 tube shaped segments on the electrically conductive core; providing an electrically conductive core having a non-round cross-section and providing a tube shaped segment having a substantially round circumference and having an interior cross-section substantially matching the non-round cross-section of the electrically conductive core; providing each of the members including a different material; installing the electromechanical roller in an electrostatographic apparatus for use as at least one of a bias transfer roll, bias charging roll, decurling roll, cleaning roll, and paper handling roll; and installing the electromechanical roller in a xerographic apparatus.

Still other aspects and advantages of the present invention and methods of construction of the same will become readily apparent to those skilled in the art from the following detailed description, wherein only the preferred embodiments are shown and described, simply by way of illustration of the best mode contemplated of carrying out the invention. As will be realized, the invention is capable of other and different embodiments and methods of construction, and its several details are capable of modification in various obvious respects, all without departing from the invention. Accordingly, the drawing and description are to be regarded as illustrative in nature, and not as restrictive.

DETAILED DESCRIPTION OF THE INVENTION

While the principles and embodiments of the present invention will be described in connection with an electromechanical roll, electrostatographic apparatus, xerographic apparatus, printing and/or copying machine, it should be understood that the present invention is not limited to that embodiment or to that application. The invention is also suitable for use as a heated or cooled biased transfer roll, biased charging roll, decurler roll, paper handling roll, compliant foam or rubber cleaning roll, or any other roll-type component serving as both an electrical as well as a mechanical rolling member. Therefore, it should be understood that the principles of the present invention and embodiments extend to all alternatives, modifications, and equivalents thereof.

Figure 1:
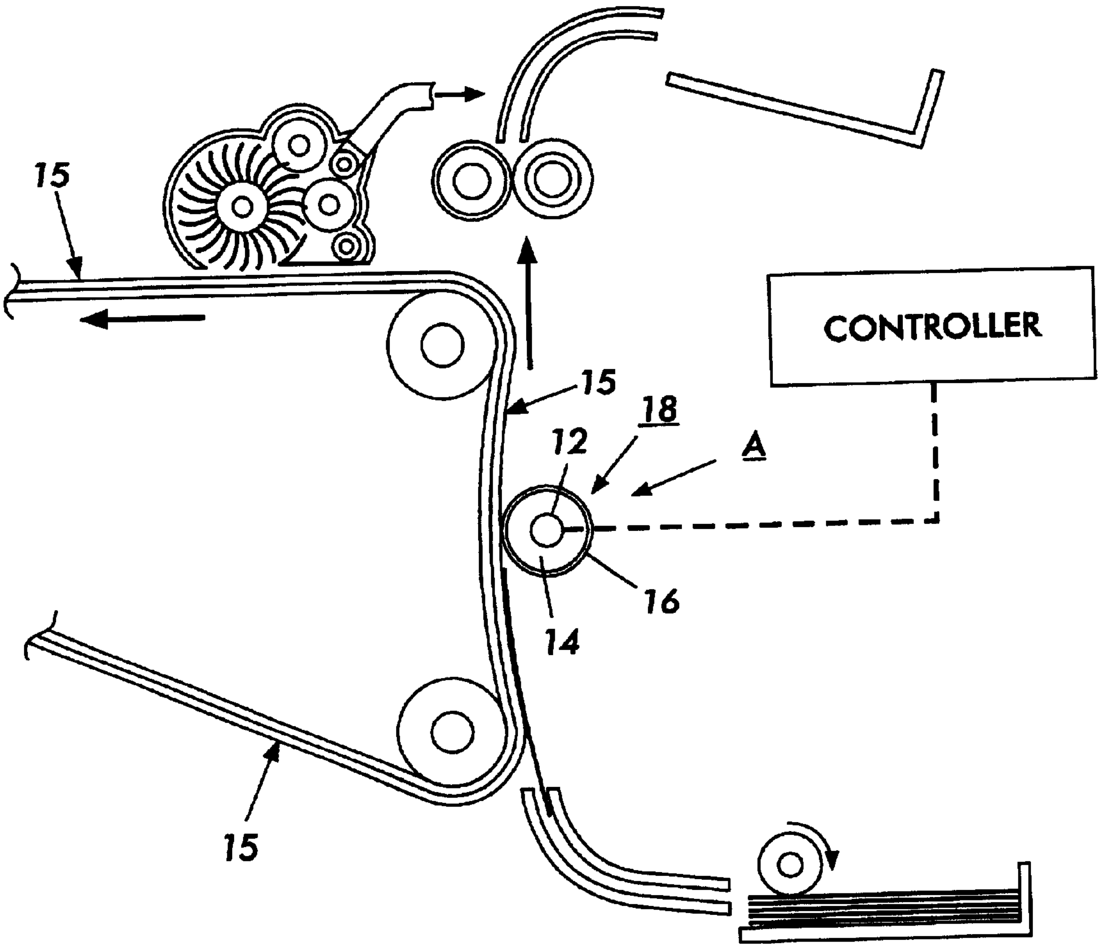
FIG. 1 is a schematic elevational view showing a portion of a printing or copying machine including an electromechanical roll such as a bias transfer roll.

Turning to FIG. 1, illustrated is an embodiment of an electro-mechanical roll such as a bias transfer roll 18 that serves as a transfer support member at transfer station A of a electrostatographic printing and/or copying machine. The bias transfer roll 18 enables transfer of the developed toner image from the image bearing photoconductive surface 15 to a copy sheet or support substrate and provides support to the copy sheet between the bias transfer roll and the photoconductive member during the transfer process.

Figure 2:
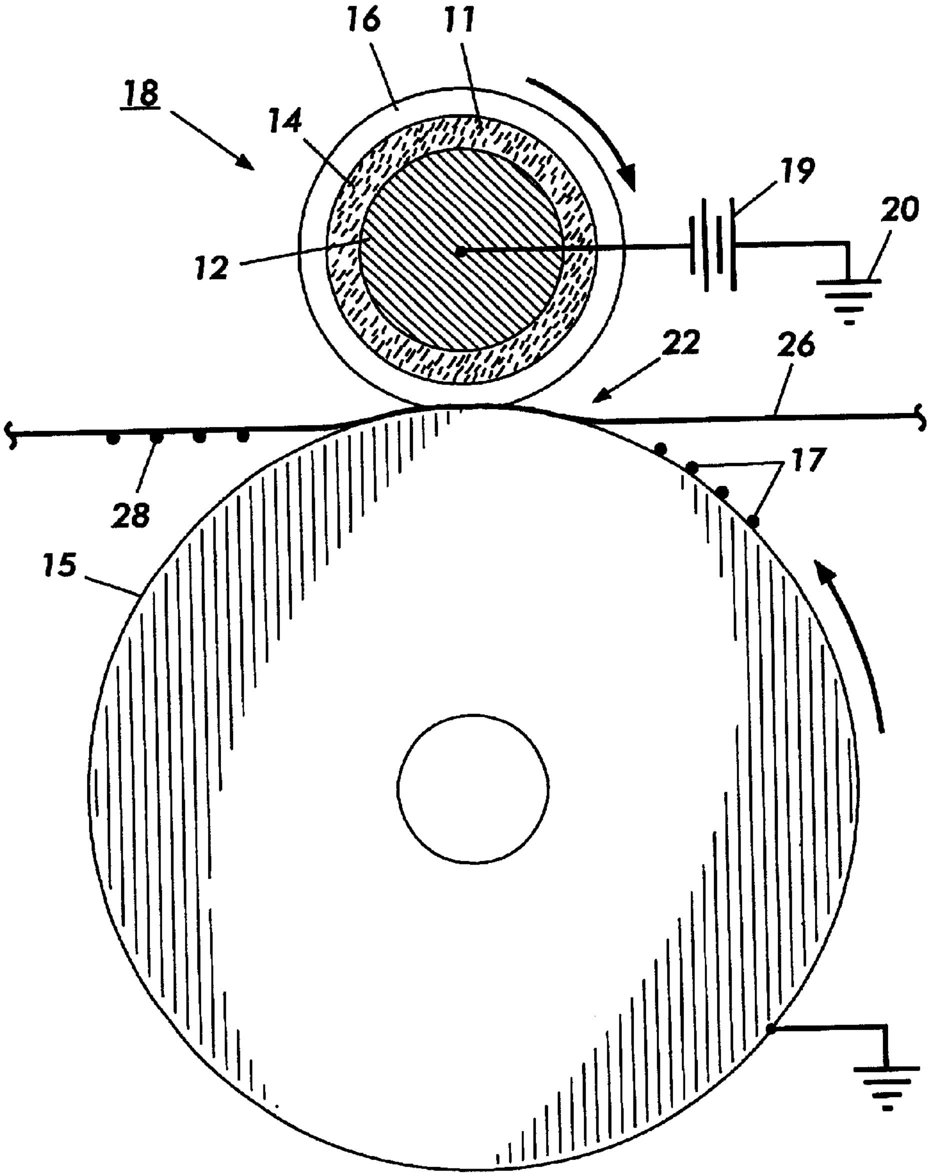
FIG. 2 is a perspective view in partial section showing the construction of an embodiment of an electromechanical roll such as a bias transfer roll.

Referring to FIG. 2, an embodiment of an electromechanical roll such as a conformable bias transfer roll member 18 is shown in the configuration of a transfer system of an embodiment of an electrostatographic printing and/or copying machine. A drum-type photoconductive insulating surface 15 is shown in operative engagement with the conformable bias transfer roll 18, forming a nip 22 therebetween. An electrical biasing source 19 such as a DC voltage source is coupled to ground 20 and to the conductive core 12 for applying a bias potential to the bias transfer roll 18 to create transfer fields in the transfer nip 22 and to induce the transfer of charged toner particles from the photoconductive surface toward the bias transfer roll 18.

The bias transfer roll 18 is subjected to a compressive force in the nip 22 formed in the area of contact between the roll 18 and the photoconductive surface 15. This compressive force causes the compression of the roll 18 such that the conductive core 12 of the roll 18 is brought into closer proximity to the photoconductive surface 15, upon which the powder toner image is located. For example, the spacing from the roll 18 to the photoconductive surface 15 may range from about zero up to about 50% of the thickness of the layer 14.

A powder toner image 17 previously formed and developed in accordance with the electrostatographic process is present on the surface 15 of the photoconductive insulating drum. A copy sheet 26 or other support substrate travels through the nip 22 formed in the area of contact between the bias transfer roll 18 and the photoconductive insulating surface 15 for receiving the powder toner image 17. Thus, the powder toner image is transferred to the support sheet 26, appearing as a transferred image 28 thereon, by operation of the bias transfer roll 18.

The bias transfer roll 18 is generally cylindrical and comprises a layer of compressible material disposed on the conductive core 12. The layer may be formed from tube shaped segments 14 positioned in a tandem relationship to another along the length of the core 12 in a coaxial manner. The segments 14 may be comprised of a polyurethane, a silicone, an epichlorohydrin (EPDM) formulation or any other substantially resistive, electrically relaxable material capable of providing desirable resistivity and compressibility characteristics. This formulation may be closed cell or open cell, i.e., any foam material, which is sufficiently compressible. The segments 14 may be made of an elastomer, such as a silicone or urethane material, or combinations thereof. The segments 14 may be made of a rubber material selected to have a suitable durometer, or hardness, that can range from very soft, soft, medium, hard, or very hard depending upon the characteristics of the desired nip and whether the roll 18 is to be heated. The segments 14 may provide a springback characteristic that is rubbery and spongy and is generally able to return to its non-deformed state upon exiting the contact region with the photoreceptor surface 15. The segments 14 may have a hardness of less than 90 Shore A, generally from about 5 to about 60 Shore A.

The segments 14 may include a conductive filler 11, particles or other suitable material dispersed throughout including, for example, carbon black particles, carbon fibers, metal particles, metal fibers, alumina metal powders or flakes, graphite filings, particles of any other satisfactory conductive material in any suitable shape or size, or combinations thereof, coated particles or fibers where either the coating, or particle, or both are suitably conductive, ionic salts, ionic salt modified polymers known as ionomers, or combinations thereof. Fillers 11 may be used to produce desired electrical properties such that a portion of the roll 18 that dynamically forms the transfer nip can temporarily act as an electrical conductor and generally act as an insulator elsewhere. This behavior, where the voltage applied to the conductive core 12 is allowed to move regionally and radially outwards across the segments 14, is referred to as electrical relaxation where the bias conducts across the segments 14 that is in, or close to, the nip region and the segments 14 remains effectively insulating everywhere else.

In addition, one or more peripheral surface coating(s) 16 may also be provided over and along the circumferential exterior surface of the segments 14. The coating 16 may be sufficiently elastic and resilient to yield to the compressible characteristics of the conformable underlying segments 14. Alternatively, the coating 16 may be harder and more durable than the segments 14 to add durability, puncture resistance, wear or dirt resistance, or improve some other desired feature such as friction or clean-ability. Coating 16 is optional and may be provided for sealing and insulative properties as required for operation of the transfer system. Optionally, one, or more of the fillers identified above may be included in the composition of the coating 16 at the same or different loading levels as required by the application. For example, if a more insulative coating 16 is desired, the filler loading level will generally be less than for the more conductive layer 14. Other fillers 11 may be added to this coating 16 to achieve other desired effects. For example, teflon™ particles may be added to reduce friction of an outermost coating 16.

The coating 16 may include or contain an electrically conductive fluorinated carbon filled fluoroelastomer, or other suitable fluoroelastomer, urethane, or similarly suitable material. The coating 16 may be used to control the resistivity of the bias transfer roll 18. In addition, the sensitivity of the resistivity may also be controlled in relationship to changes in relative humidity, temperature, corona exposure, corrosive environment, solvent treatment, contamination, cycling to high electric fields and running time. The coating 16 may advantageously improve the surface finish and mechanical properties of the roll 18. The coating 16 may be selected and used to improve abrasion and wear resistance, to prevent contamination, and as a material to provide a smooth surface finish, selected surface finish, and selected properties, such as friction. Coating 16 may include combinations of coating layers used for different purposes, for example, one layer to prevent contamination and one layer to modify friction properties.

Figure 3:
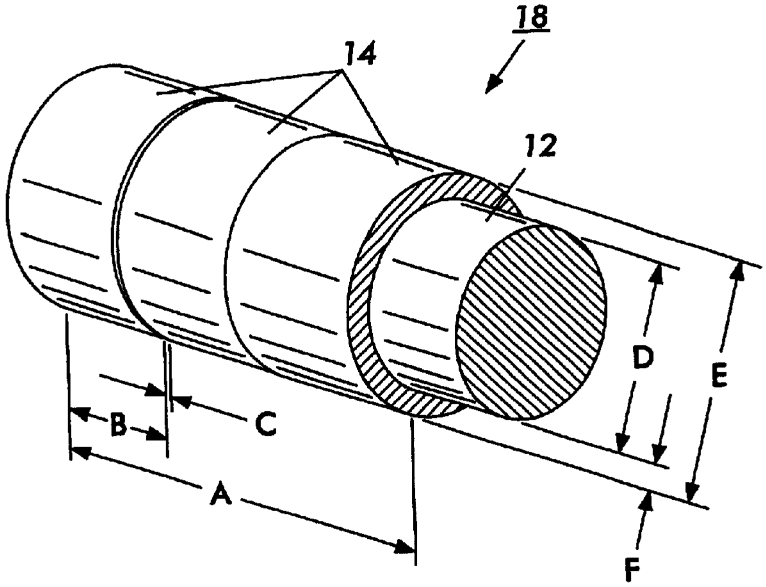
FIG. 3 is a perspective view in partial section showing the construction of an embodiment of an electromechanical roll such as a bias transfer roll.

Referring now to FIG. 3, there is shown a perspective cutaway view of an embodiment of an electro-mechanical roll 18 illustrating the construction thereof. The roll 18 may be formed upon a solid, rigid cylinder 12 that is fabricated of a conductive metal, such as aluminum, copper, stainless steel, steel, brass, or, conductive plastic, carbon filled nylon, and pultruded conductive carbon filled plastic or the like, capable of maintaining rigidity, structural integrity and capable of readily responding to a biasing potential placed thereon. The conductive core 12 may optionally be tubular and hollow. The conductive core 12 may optionally have a surface finish of less than 64 microinches.

In embodiments, the electromechanical roll 18 may include: the overall length, dimension A ranging from 8 inches to 120 inches, generally from about 12 inches to about 36 inches; dimension B of individual tube shaped segments ranging from 0.5 inch to 18 inches, generally from about 3 inches to about 12 inches; dimension C of gaps between individual tube shaped segments ranging from 0 inches to 0.3 inches, generally from about 0 inches to about 0.10 inches; dimension D, the core outer diameter ranging from 0.2 inches to 47 inches, generally from about 0.375 inches to about 11 inches; dimension E diameter ranging from 0.50 inch to 48 inches, generally from about 0.625 inches to about 12 inches; dimension F, the thickness of the compressible layer(s) ranging from 0.004 inches to 4.0 inches, generally from about 0.2 inches to about 0.75 inches. The electro-mechanical roll 18 may include multiple layers of segments 14 or multiple layers of coatings 16 on top of another or alternating combinations thereof. The segments 14 may be in contact with one or more other segments 14. The total number of segments 14 in one layer or in one plane may range from 2 to 24.

The segments 14 may be positioned on the core 12 to form a butting interface between adjacent ends of adjoining segments 14 and in such a manner to sustain a minimum compression force sufficient to resist the lateral deformation forces of the nip formed in the apparatus. The segments 14 may also be positioned such that they form a gap between one another. The lengths of the segments 14 may be equal or they can vary in length over the roll 18. The thickness of the segments 14 may be equal or they can vary over the length of the roll 18. A variation in thickness may require grinding of the exterior surface of the roll 18 to a desired contour or profile, a thickness which may be continuous and gradual or stepwise. The exterior surface of the segments 14 may be coated to provide certain performance characteristics and acceptable transfer and print quality. The exterior surface of the segments 14 or coating 16 may be ground to a smooth surface, to the same size, to a certain pattern, to a certain profile such as concave, convex, sinusoidal. The profile of the electromechanical roll 18 may be designed for selected paper drive or registration purposes.

The segments 14 may be placed on the core 12 using a lubricant, such as water or alcohol, but are generally placed on a clean interface to form a suitable electrical interface. Optionally, the segments 14 may be thermally, frictionally or chemically disposed on the electrically conductive core 12 by using an adhesive, solvent welding, and the like. Friction between internal surfaces of the layer 14 and core 12 may be sufficient for fastening purposes as an exterior surface of the core 12 or interior surface of the segments 14 may be sufficiently rough to prevent movement between the core 12 and the segments 14. An adhesive layer may be used to adhere the segments 14 to the core 12 and may be selected from, for example, epoxy resins, polyurethanes, and polysiloxanes, or blends or copolymers thereof. Adhesives may include materials such as THIXON 403/404, Union Carbide A-1100, Dow TACTIX 740, Dow TACTIX 741, and Dow TACTIX 742. A curative for the adhesives may include Dow H41.

Figure 4:
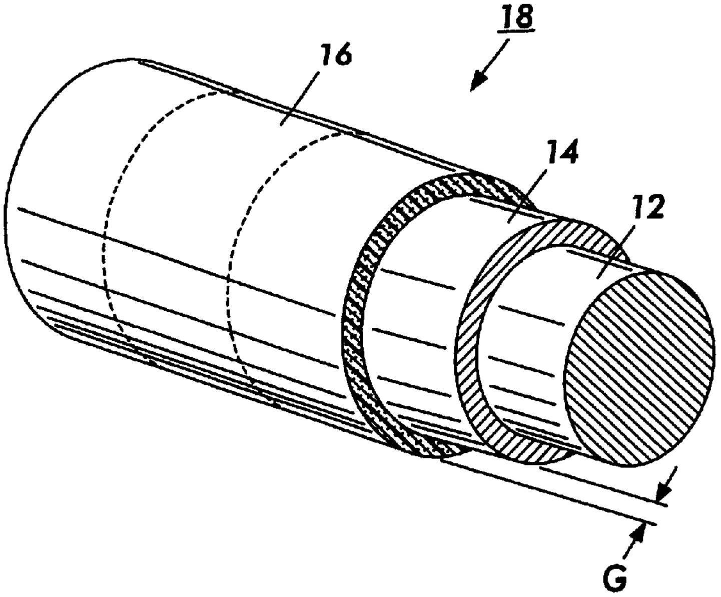
FIG. 4 is a perspective view in partial section showing the construction of an embodiment of an electro-mechanical roll such as a bias transfer roll including a coating thereon.
Figure 5:
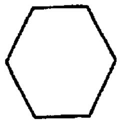
FIGS. 5–9 are cross-sectional views of various embodiments of a non-circular electrically conductive core of an electromechanical roll.
Figure 6:
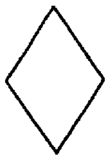
Figure 7:
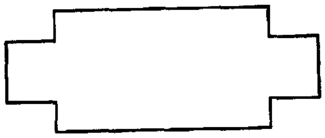
Figure 8:
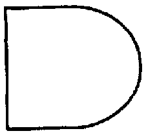
Figure 9:
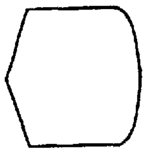

FIG. 4 illustrates an embodiment of an electro-mechanical roll 18 having segments 14 positioned between the conductive core 12 and a coating 16. In embodiments, the thickness of the coating 16, dimension G, may range from 0.00001 inches to 0.75 inches, generally from about 0.001 inches to 0.16 inches.

In embodiments, resistivity ranges may vary for transfer systems designed to operate at different transfer sheet throughput speeds and is selected to correspond to the roller surface speed and nip region dimension such that the time necessary to transmit the bias from the conductive core to the external surface of the bias system member is roughly equal to, or less than the dwell time for any point on the bias system member in the transfer nip region. It has been found that a resistivity of the outer layer of between $10^4$ and $10^{14}$ ohm-cm, generally from $10^4$ to about $10^{12}$, and generally from about $10^8$ to about $10^{10}$ ohm-cm is sufficient for this requirement if there is no intermediate layer positioned between the outer resistive layer and the substrate. If, however, there is an intermediate layer positioned between the substrate and the outer resistive layer, the resistivity may be from $10^5$ to $10^{12}$ ohm-cm and generally from about $10^7$ to about $10^{11}$ ohm-cm.

By precisely cutting lengths of the segments 14, positioning them on the electrically conductive core 12, and then optionally gluing them in place, optionally applying compression, optionally grinding, and optionally applying coating thereon provides a low cost, easy-to-manufacture, electromechanical roll 18 such as a bias transfer roll having a desired length, contour and finish. Ends of the segments 14 may be positioned and joined together such that under compression, the existence of seams are not visible in the resulting print. The print quality of images transferred across such seam regions as well as the durability of the seams during exposure to the nip dynamics is generally good. Alternatively, the presence of a moderate gap between the ends of the segments 14 allows the roll 18 to function satisfactorily and provide generally good print quality.

In embodiments, an electromechanical roll such as a bias transfer roll may be produced, for example, by: (1) providing lengths of foam composition in an appropriate size tube form; (2) cutting the foam tubes to precise end regions, for example, perpendicular, zig-zag, angular, bullet shape, conical, or various patterns suitable for interlocking or adjoining to adjacent tubes; (3) providing an electrically conductive core member such as a metal tube or shaft; (4) applying an adhesive layer to the core member; (5) applying the foam tubes to the core member; (5) butting the lengths of foam composition together; (6) applying compression of at least 1 gram/sq. mm to the entire periphery of lengths of foam composition; (7) allowing the adhesive to set and/or cure while maintaining the compressive force; (8) grinding the roll circumference to appropriate dimension; (9) applying an overcoat layer; and (10) allowing the overcoat layer to dry. The molding process may include shot foaming and curing in a mold.

Such a manufacturing process advantageously provides increased flexibility in production of electromechanical rolls of various lengths with generally no upper limit of length. For example, it is possible to produce rolls with lengths of many hundreds of feet, or even miles. In addition, such manufacturing process advantageously provides a system for simultaneously testing the suitability of various materials. Moreover, the electromechanical roll and method of manufacturing described advantageously overcomes the limitations of, for example, short time required for acceptable foaming and curing balanced against the time and pressures it takes to fill the mold cavity in conventional manufacturing processes. For example, when the volume of the cavity is relatively small and the ratio of cavity length to cross sectional area is large, the time to fill it via injection molding must be within the acceptable parameters of foam formation and crosslinking completion. However, once the ratio of length-to-area exceeds a critical value, which may occur with long thin walled parts, the versatile and low cost molding/foaming process is generally no longer viable. Moreover, the increased mold-fill time associated with such molds along with certain foam formulations, may cause premature curing which then interrupts the mold filling process. In addition, the high pressures required for rapid filling of the long, thin cavity acts as a back pressure to the foaming process and foam formation may be impeded. Therefore, desired pore size, quality, and foam density may not be obtainable other than for a limited range of cavity geometries. An alternative manufacturing process of extrusion often does not yield the same range of desirable properties for material of a bias transfer roll. Thus, while extrusion may be a viable process to create the larger length material in one-piece for the electromechanical roll, the uniformity of critical properties driving functionality such as electrical conductivity and durometer, may not be acceptable over very long extrusion runs.

In embodiments, as illustrated in FIGS. 5–9, the cross-sectional shape of the core 12 may include a variety of non-circular shapes. For example, the cross-section of the core 12 may be non-circular, and the inside shape of the segments 14 may be non-circular, while the outside surface of the segments 14 may be generally circular. The segments 14 may be slip fit onto the core 12 with the orientation of the non-circular features of the core 12 aligned with the similar non-circular features of the segments 14. This shape-matching process enables the segments 14 to be mounted onto the core 12 and assures non-slip mounting. Alternatively, suitable non-circular geometric shapes of cores 12 and inside shapes of segments 14 are envisioned, for example, rectangles, squares, triangles, ovals, and the like, or combinations thereof.

In an embodiment, an electromechanical roll is formed, including an electrically conductive core and a series of tube shaped members positioned in a tandem relationship to another and surrounding the electrically conductive core.

In another embodiment, an electrostatographic apparatus includes an electro-mechanical roll having more than one, for example, from two to twenty four, tube-shaped segments positioned in a tandem relation to one another on an electrically conductive core.

In yet another embodiment, an electromechanical roll is formed for use in printing and copying machines may have a length ranging from 8 to 120 inches and an outside diameter ranging from 0.25 inches to 48 inches. The roll may be made by using a plurality of molded or extruded, tube-shaped segments positioned in a tandem relation to one another on an electrically conductive core. Each tube-shaped segment may have a length, for example, up to about 50% of the overall length of the roll.

In a further embodiment, an electromechanical roll includes an electrically conductive core having a length and an outside surface. A plurality of conformable members are disposed coaxially over a portion of the outside surface of the electrically conductive core, each of the plurality of conformable members have a length. The plurality of members are positioned in tandem relationship to one another over the outside surface of the electrically conductive core.

In yet another embodiment, a bias transfer roll includes an electrically conductive core having a length ranging from about 8 inches to about 120 inches and an outside surface. A plurality of conformable tube-shaped segments are disposed coaxially over a portion of the outside surface of the electrically conductive core and positioned in tandem relationship to one another along the outside surface of the electrically conductive core. Each of the tube-shaped segments have a length of at least 0.5 inches. An overcoat layer is disposed on the plurality of conformable tube-shaped segments.

In another embodiment, a xerographic apparatus includes a development unit; and an electromechanical roll. The electromechanical roll including a stainless steel electrically conductive core having a length ranging from 8 inches to 120 inches and an outside surface. A plurality of tube-shaped segments are disposed coaxially over at least a portion of the outside surface of the stainless steel electrically conductive core. The tube-shaped segments are positioned in tandem relationship to one another along the outside surface of the electrically conductive core. Each of the tube-shaped segments includes a polymer or an elastomer and has a length ranging from 0.5 inches to 12 inches. An overcoat layer is disposed on the tube-shaped segments. The xerographic apparatus is adapted for copying and/or printing.

In an embodiment, each segment 14 can be formed of a different material and then be positioned on the electrically conductive core 12 and used for component development and material selection purposes. For example, an 8 inch to 14 inch electro-mechanical roll 18 such as a bias transfer roll having an outside diameter up to 2 inches may include tubular shaped segments 14, each segment ranging from 0.5 inch to 2 inches wide, positioned in a tandem relation to another on the conductive core 12. The ability to incorporate a variety of materials in the form of segments 14 on the core 12 provides an efficient testing system to differentiate performance of various materials during a single transfer experiment. Using such a system for testing various materials can help build statistics into experimentation with different materials without the need for a large number of costly, time consuming, repetitive trials.

Such electromechanical rolls and methods of making the same advantageously overcome various limitations and provide generally low development and production costs, and generally high quality rolls.

While this invention has been described in conjunction with various embodiments, it is evident that many alternatives, modifications, and variations thereof will be apparent to those skilled in the art. Accordingly, it is intended to embrace all such alternatives, modifications, and variations and their equivalents.

What is claimed:

1. A method of making an electromechanical roll for an electrostatographic apparatus comprising:

providing a plurality of tubes, each of the tubes having an outside surface and a length and two ends, the tube material comprising at least one of an elastomer and polymer formulation;

cutting at least one end of each of the plurality of tubes to form a selected end geometry;

providing an electrically conductive member;

disposing the plurality of tubes on the electrically conductive member in a tandem relationship; and positioning the plurality of tubes such that each of the tubes are located up to 0.3 inches apart from another tube.

2. The method of making an electromechanical roll of claim 1, further comprising cleaning the electrically conductive core prior to disposing the plurality of tubes thereon.

3. The method of making an electromechanical roll of claim 1, further comprising applying an adhesive to the core member.

4. The method of making an electromechanical roll of claim 1, further comprising applying a lubricant to the electrically conductive core prior to disposing the plurality of tubes thereon.

5. The method of making an electro-mechanical roll of claim 1, further comprising contacting at least one end of each tube with an end of another tube.

6. The method of making an electromechanical roll of claim 1, further comprising applying compression of at least 1 gram/sq. mm to the outside surface of the tubes.

7. The method of making an electro-mechanical roll of claim 3, further comprising allowing the adhesive to cure.

8. The method of making an electro-mechanical roll of claim 7, further comprising grinding the circumference of the outside surface.

9. The method of making an electro-mechanical roll of claim 1, further comprising applying a coating on the outside surface of the tubes.

10. The method of making an electro-mechanical roll of claim 9, further comprising allowing the coating to dry.

11. The method of making an electro-mechanical roll of claim 1, further comprising positioning the tubes such that each tube is located up to 0.1 inches away from another tube.

12. A method of making an electro-mechanical roll comprising:

providing a plurality of tubes, each of the tubes having an outside surface, a length of at least 0.5 inches, and two ends;

cutting an end portion of selected tubes to form selected geometries for matching joining regions between ends of adjacent tubes;

providing a core member;

applying an adhesive layer to the core member;

disposing the plurality of tubes on the core member and matching joining regions between selected geometries of adjacent tubes;

contacting the joining regions together;

applying compression of at least 1 gram/sq. mm to the outside surface;

allowing the adhesive to cure;

grinding the circumference of the outside surface;

applying a coating on the outside surface; and allowing the coating to dry.

13. The method of making an electro-mechanical roll of claim 12, further comprising using a molding process to form the plurality of tubes.

14. The method of making an electromechanical roll of claim 12, further comprising using a foaming process to form the plurality of tubes.

15. The method of making an electromechanical roll of claim 12, further comprising using an extrusion process to form the plurality of tubes.

16. A method of making an electromechanical roll for an electrostatographic apparatus comprising:

providing an electrically conductive core having a length and an outside surface;

providing a plurality of conformable members, each of the plurality of members having a length;

disposing the plurality of conformable members coaxially over a portion of the outside surface of the electrically conductive core; and positioning the plurality of members in tandem relationship to one another along the outside surface of the electrically conductive core such that no tube is located greater than 0.3 inches from another tube.

17. The method of making an electro-mechanical roll of claim 16, further comprising applying a coating over the plurality of conformable members.

18. The method of making an electromechanical roll of claim 16, further comprising providing a plurality of members including a polymer and an electrically conductive core including a stainless steel.

19. The method of making an electromechanical roll of claim 16, further comprising providing each conformable member in the form of a tube-shaped segment having a length ranging from 0.5 inches to 18 inches.

20. The method of making an electromechanical roll of claim 19, further comprising providing from 2 to 24 tube shaped segments on the electrically conductive core.

21. The method of making an electromechanical roll of claim 16, further comprising providing an electrically conductive core having a non-round cross-section and providing a tube shaped segment having a substantially round circumference and having an interior cross-section substantially matching the non-round cross-section of the electrically conductive core.

22. The method of making an electro-mechanical roll of claim 16, further comprising providing each of the members including a different material.

23. The electromechanical roll of claim 16, further comprising installing the electro-mechanical roller in an electrostatographic apparatus for use as at least one of a bias transfer roll, bias charging roll, decurling roll, cleaning roll, and paper handling roll.

24. The electromechanical roll of claim 16, further comprising installing the electromechanical roller in a xerographic apparatus.

* * * * *